INVENTOR
Clifford L. Gruenwald
BY
Wood, Herron & Evans
ATTORNEYS

United States Patent Office 3,518,425
Patented June 30, 1970

3,518,425
METHOD AND APPARATUS UTILIZING A RADIOACTIVE SOURCE AND DETECTOR FOR WEIGHING MATERIAL CARRIED BY A SCREW CONVEYOR
Clifford L. Gruenwald, Cincinnati, Ohio, assignor to The Ohmart Corporation, Cincinnati, Ohio, a corporation of Ohio
Filed May 17, 1966, Ser. No. 550,821
Int. Cl. G01n 21/26; H01j 37/00
U.S. Cl. 250—43.5                                6 Claims

ABSTRACT OF THE DISCLOSURE

Apparatus for weighing the amount of material delivered by a screw conveyor. The apparatus includes an elongated radioactive source and an elongated detector, such as an ionization chamber, Geiger tube or the like. The source and detector are mounted parallel to one another on opposite sides of the screw conveyor. The axis of the source and detector are disposed substantially perpendicular to the free surface of material carried by the conveyor. The detector generates an electrical signal corresponding to material weight per unit length of conveyor. A tachometer generates a signal corresponding to conveyor speed. These signals are multiplied and integrated to detect a signal corresponding to total material weight.

---

This invention relates to measuring systems and is particularly directed to a novel method and apparatus for measuring the weight of material conveyed by a screw conveyor.

The present invention is concerned with systems for continuously weighing material carried by a conveyor of the type disclosed in the copending patent application of Philip E. Ohmart for "Method and Apparatus for Continuously Weighing Material on a Conveyor," Ser. No. 298,179, now Patent No. 3,278,747. Such systems employ an elongated radioactive source and a radiation detector disposed on opposite sides of the conveyor. The radiation emitted from the source passes through the conveyor and material and impinges upon the elongated detector. This detector may be of any suitable type, such as a radiant energy electric generator, an ionization chamber, Geiger counter or the like.

The detector causes an electrical current flow which is correlated with the amount of radiation impinging upon the detector. The amount of this radiation in turn depends upon the amount of radiation which is absorbed by the material carried by the conveyor. Thus, the detector current is correlated with the weight of material carried by the conveyor along the length of conveyor traversed by the radiation. This signal thus represents material weight per unit length of the conveyor; for example, pounds per foot.

In almost all instances, however, the user is primarily interested in the total amount of material carried by the conveyor. Consequently, in order to ultimately obtain this information, a second signal generator in the form of a tachometer, or the like, is provided. This tachometer is connected with the conveyor and provides a signal correlated with conveyor speed, such as feet per minute. Additionally, an electrical multiplying circuit is provided for multiplying the tachometer or conveyor speed signal (feet per minute) by the detector signal as amplified which represents the weight per unit length (pounds per foot). The result of this multiplication is then integrated with respect to time to provide a signal correlated with the total weight of material carried by the conveyor.

It will be appreciated by those skilled in the art that in order to multiply the tachometer speed signal by the amplified weight per unit area signal from the detector, it is essential that this latter signal be linearized. The difficulty is that in practice the amplified detector signal has proven to be quite non-linear with respect to conveyor loading.

The present invention is predicated upon the empirical discovery and determination that the linearity of the amplified detector output signal varies with the position of the detector and calibration source relative to the conveyor and that the amplified detector output signal most closely approximates the desired linear signal when the elongated detector and source are disposed parallel to one another and at an angle both to the horizontal and vertical. This angle is such that the detector and source are substantially normal to the free surface of the material carried by the conveyor.

More particularly, it has been observed empirically when the source and detector are disposed in a horizontal plane above and below the conveyor in the manner shown in Ohmart application Ser. No. 298,179, now Patent No. 3,278,747, the output signal from the detector displays a substantial non-linearity with respect to changes in conveyor loading. I have determined that the principal cause of this non-linearity is that the material disposed within the screw conveyor does not have an upper or free surface lying in a substantially horizontal plane, but rather when the conveyor is partially loaded, the free surface of material within the conveyor is angulated with respect to the horizontal.

The angle assumed by the free surface of the material depends both on the nature of the material itself, i.e. its internal friction characteristics and the friction between the material and the screw conveyor, and upon the loading of the conveyor. In a horizontal screw conveyor, the rotating helical screw of the conveyor tends to pull the material up along one side of the cylindrical housing and to force the material down along the opposite side of the housing. For conveyor loadings up to approximately 50%, the free surface of the material thus is generally planar and is angulated with respect to both horizontal and vertical. As the loading increases, the angle increases. This angle can be empirically determined for any material. For example, for one sand material the angle was found to be approximately 45°. As the loading of the conveyor, however, substantially exceeds 50%, some of the material is carried over by the screw and a build-up starts on the low side of the housing. I have determined that this changing profile of the material within the conveyor with loading is largely responsible for the non-linearity of the amplifier detector output signal with respect to conveyor loading.

As is explained in detail below, the non-linearity of the detector output signal is highly disadvantageous for two reasons. In the first place, the pronounced non-linearity observed when the detector and source are disposed horizontally above and below the conveyor makes it extremely difficult to linearize the signal by electrical means. Also, for heavy loadings of the conveyor, small changes in the detector output signal correspond to very substantial changes in amount of material carried by the conveyor. Thus, a small electrical signal error corresponds to a large error in the weight of material indicated.

When, however, the detector and source are oriented perpendicular to the free surface of the material in accordance with the present invention, the output signal from the detector closely approximates the theoretical linear signal relationship for loading of a conveyor from zero to approximately 60% of the conveyor loading. This range of loading corresponds to that normally encountered when the conveyor is operated solely as a conveyor and not as a feeder. As a consequence, the linearizing of this signal prior to multiplication is greatly facilitated.

Moreover, the output signal from the detector for high loadings of the conveyor, for example from 60% to 100%, such as those which would be employed when the conveyor is used as a feeder, while non-linear in nature have a relatively small departure from the theoretical linear line. As a result, an error in the detector output signal corresponds to a much lesser weight difference in material than is the case when the detector and source are horizontally disposed. In fact, the orientation of the detector and source substantially perpendicular to the free surface of the material increases the accuracy of the system by 50% or more as compared with a system utilizing a horizontally disposed detector and source.

These and other objects and advantages of the present invention will be more readily apparent from a consideration of the following detailed description of the drawings illustrating a preferred embodiment of the invention.

Figure 1:
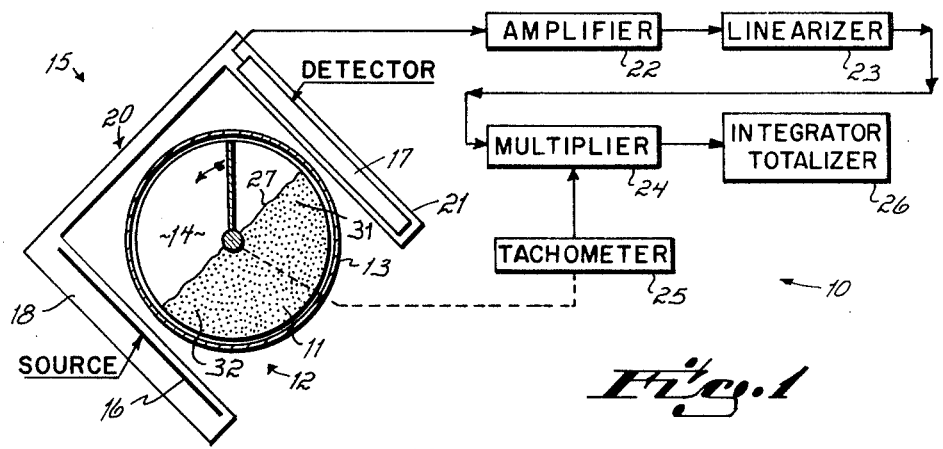
FIG. 1 is a diagrammatic view and circuit diagram of a screw conveyor weighing system of the present invention.

One form of system constructed in accordance with the principles of the present invention for continuously weighing material carried by a screw conveyor is shown in FIG. 1. As there shown, the screw conveyor weighing system 10 is adapted to measure the mass flow rate of material 11 conveyed by a horizontal screw conveyor 12. The screw conveyor 12 is a conveyor of conventional construction, including an outer cylindrical or trough-shaped housing 13 surrounding a helical screw member 14. The screw member 14 is driven in a counterclockwise direction in the embodiment shown by any suitable form of motor drive. Since the details of the screw conveyor and motor drive are well known in the conveying art, these details are not illustrated in the present application.

Screw conveyors, such as screw conveyor 12, are utilized to convey various forms of dry particulate material and material in a slurry form. In general, these conveyors are utilized in one of two ways, either as a feed conveyor for supplying material at a predetermined rate to process equipment, or as a straight material conveyor for transporting material from one place to another as, for example, from a storage area to a car loading station. When the conveyor is used as a screw conveyor, it is normally not fully loaded and in fact is generally loaded to somewhat less than 50% of its maximum capacity. On the other hand, when the screw conveyor is utilized as a feeder, it is normally run nearly fully loaded, i.e. close to 100% of its rated output.

The weighing system of the present invention is an improvement over the weighing system disclosed in the copending application of Philip E. Ohmart for "Method and Apparatus for Continuously Weighing Material on a Conveyor," Ser. No. 298,179 now Pat. No. 3,278,747, filed July 29, 1963. It is to be understood that the same detector and source holder construction shown in that application can be employed in the present application. Accordingly, it is considered unnecessary to describe the details of those components in the present application since the disclosure of application Ser. No. 298,179 now Pat. No. 3,278,747 is expressly incorporated by reference herein.

In general, the present weighing system comprises a radiation mass detecting unit indicated generally at 15. This unit includes an elongated, or distributed, radioactive source 16 and an elongated detector of radiation 17. Source 16 is mounted in one arm 18 of a C-frame 20. The source may comprise a continuous strip of radioactive material of a length slightly greater than the maximum diameter of conveyor housing 13. Alternatively, the source 16 can comprise a plurality of spaced point sources of radiation positioned so as to give a distributed radiation field pattern, described in the above noted application, across the diameter of the conveyor generally similar to that of a continuous strip source.

Detector 17 is mounted in a second arm 21 of C-frame 20. This detector preferably comprises a substantially continuous detector, the effective length of which is preferably approximately equal to the diameter of housing 13. Detector 17 can be in the form of a single elongated detector or a plurality of individual detectors connected in parallel.

Source 16 is preferably a suitable emitter of gamma rays, such as cesium 137. It will, of course, be appreciated that other forms of radiation sources can be employed, such as a bremsstrahlung source if desired. The strength of the source is chosen in relation to the diameter of the screw conveyor and the material to be conveyed so that at least a potrion of the radiation passes through the material when the conveyor is fully loaded and impinges upon detector 17. A portion of the radiation emitted by the source is absorbed by the material carried by conveyor 13 and, consequently, does not impinge upon the detector.

The detector 17 is of any suitable type which is effective to vary an electrical current flow in accordance with the amount of radiation impinging upon the detector. One suitable form of detector is a radio electric generator of the type disclosed in detail in the copending application of Philip E. Ohmart, Ser. No. 298,179, now Pat. No. 3,278,747. Alternatively, the detector 17 can be constituted by an ionization chamber, Geiger counter or the like.

It will be appreciated that the output signal of the detector is actually correlated with the weight of material per unit length of the screw conveyor. This current output signal is normally of a small magnitude, depending of course on the type of detector employed. For example, the signal may be of the order of $10^{-11}$ amperes. The output signal from detector 17 is amplified by a suitable amplifier 22. Since, however, the signal is to be subsequently multiplied by a speed signal in order to provide a signal which can be integrated to give total weight, it is first necessary to linearize the amplifier output signal which is done in a conventional linearizing circuit indicated generally at 23.

The output signal from the linearizer, which is now a linear signal representing weight per unit length, preferably pounds per foot, is fed to a multiplier circuit indicated generally at 24. The multiplier circuit receives a second, or speed input signal from a tachometer indicated generally at 25. The tachometer is driven from the screw conveyor motor drive or is connected to the screw 14 in any suitable manner. It wil be appreciated that in some installations, where the speed of the conveyor is absolutely constant, that the tachometer 25 can be omitted. The tachometer output signal which is a "feet per minute" signal is applied to multiplier circuit 24. The output of this circuit represents the flow rate of the material in the screw conveyor in pounds per minute. This signal is applied to an integrator totalizer circuit indicated generally at 26. The integrator totalizer circuit 26 is effective to integrate the pounds per minute output signal from multiplier circuit 24 with respect to time so that the output from the integrator totalizer circuit represents the total number of pounds of material conveyed by the conveyor 12. The results of this integration can be displayed and/or recorded on any suitable form of counter, chart or the like.

It will be noted in FIG. 1 that the detector and source are disposed parallel to one another and perpendicular to an extended diameter of the screw conveyor. Moreover, the detector and source are disposed at an angle with respect to both the horizontal and vertical. This angle is determined by the sloping free surface 27 of the material carried by the conveyor. Specifically, the detector and source are disposed substantially perpendicular to the plane of this free surface.

The significance of this orientation of the detector and source relative to the screw conveyor 13 can best be understand from a further consideration of FIGS. 2A, 2B, 3A, 3B, 4A and 4B. It is to be understood that FIGS. 4A and 4B correspond to the orientation of this invention as shown in FIG. 1, while FIGS. 2A, 2B, 3A and 3B correspond to other orientations not providing the highly advantageous results of the orientation of FIGS. 1 and 4B.

Figure 2A:
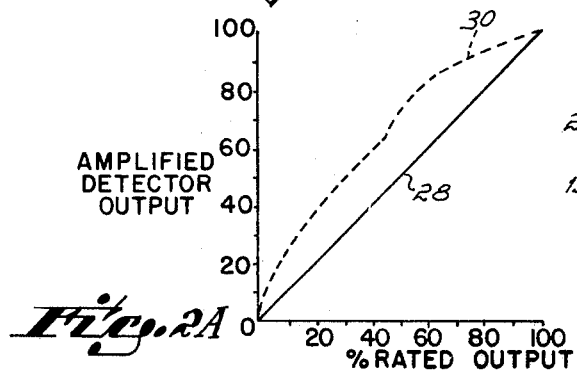
FIG. 2A is a graph in which the amplified detector output is plotted against the loading of material in the conveyor for the geometry of conveyor, detector and source illustrated in FIG. 2B.
Figure 2B:
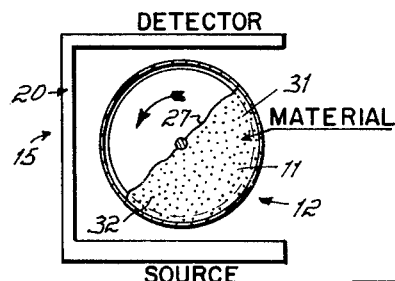
FIG. 2B is a diagrammatic view of a screw conveyor having a detector and source disposed in horizontal planes above and below the conveyor.

More particularly, FIG. 2B represents a screw conveyor in which the detector and source are mounted in horizontal planes above and below the conveyor in the same general orientation shown in Ohmart application Ser. No. 298,179, now Pat. No. 3,278,747. When it was desired to construct a system for weighing material carried by a screw conveyor or feeder, the geometry of FIG. 2B was chosen. However, a difficulty was encountered in that the output signal from the amplifier 22 was substantially non-linear as shown in FIG. 2A.

In this graph, the abscissa values represent conveyor loading expressed as the percent of rated output of the conveyor. The ordinate values represent the output of amplifier 22. The solid line 28 represents the desired linear relationship between the amplifier output signal and the loading of material on the conveyor. However, it will be noted that the actual output signal obtained, indicated by dotted line 30, was quite nonlinear and departed widely from the desired linear line 28. The divergence of the actual detector signal versus conveyor loading curve was greatest for heavy loadings of the conveyor, e.g. above 65% of rated conveyor output, the region of which the conveyor would be used for feeder operation. Because of the nature of the output curve in this region, a 1% error in detector signal represents approximately a 3% error in the amount of loading in terms of the rated output of the conveyor.

As a result, the signal obtained from the detector and source mounted as shown in FIG. 2A had two principal difficulties. In the first place, even a small error in detector or amplifier output signal corresponded to a large error in the amount of material indicated as being conveyed. Secondly, because of the extreme non-linearity of the output signal from the amplifier, the signal was extremely difficult to linearize, i.e. to transform into a linear signal as represented by solid line 28 which is necessary for feeding to multiplier 24.

When the difficulty with the output signal from the detector and source as oriented FIG. 2B was discovered, I conjectured that the difficulty might possibly be due in part to the disposition of the material within the screw conveyor. Specifically, with a particulate material disposed within the conveyor and a screw rotating in a counterclockwise direction as shown in FIG. 2B, the free surface 27 of the material within the conveyor was found not to lie in a true horizontal plane, but rather to be disposed at an angle of repose with the material being banked so as to have a high side in the area 31 in which the screw 14 tended to lift the material and having a low side in the area 32 in which the screw 14 tended to carry the material downwardly. By way of example, in a conveyor conveying sand with a screw rotating at 17 r.p.m. and a conveyor housing of 12 inches in diameter, this angle of repose was found to be approximately 45°.

Figure 3A:
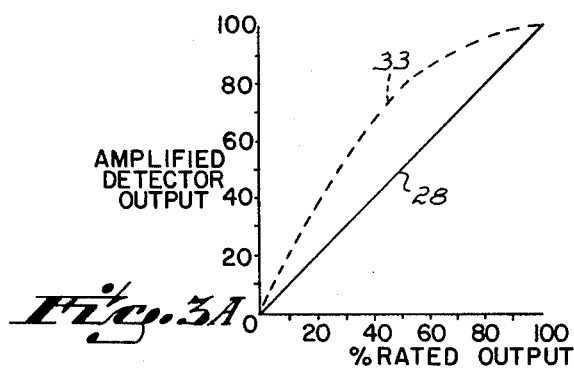
FIG. 3A is a graph in which the amplified detector output is plotted against the loading of material in the conveyor for conveyor, source and detector orientation shown in FIG. 3B.
Figure 3B:
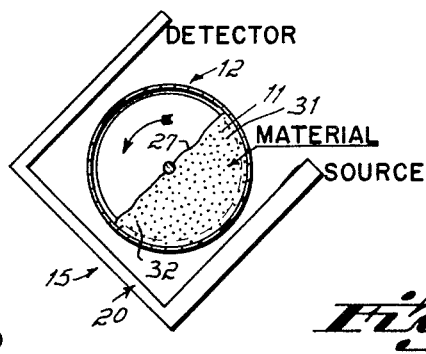
FIG. 3B is a diagrammatic view of a conveyor, detector and source in which the detector and source are disposed on opposite sides of the conveyor substantially parallel to the free surface of the material within the conveyor.

Based upon the assumption that the disposition of the material within the screw conveyor might be responsible for the difficulty, I attempted to remedy the defect by shifting the detector and source so that they extended parallel to the surface of the material in the same relative orientation as employed in Ohmart application Ser. No. 298,179, now Pat. No. 3,278,747. This orientation of the source and detector and opposite sides of the screw conveyor substantially parallel to the free surface 21 of the material within the conveyor is illustrated in FIG. 3B. When measurements were made utilizing the orientation of the detector and source as there shown, it was found that the amplified output signal from the detector did in fact vary with conveyor loading in a different manner. However, the amplified detector output signal was still substantially non-linear with respect to conveyor loading; although it did form a smoother curve somewhat easier to linearize than the output curve illustrated in FIG. 2A. The principal difficulty with the curve 33 obtained with the apparatus oriented as shown in FIG. 3B is that a smaller error in detector amplifier reading still corresponds to a relatively large change in indicated loading of the conveyor. Thus, for example, a 1% error in the detector output or amplifier output particularly with the conveyor heavily loaded, represents approximately a 3% error in material weight.

Figure 4A:
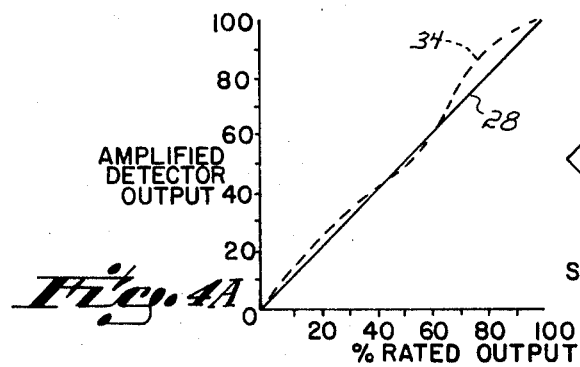
FIG. 4A is a graph in which the amplified detector output is plotted against the loading of material in the conveyor for the conveyor, detector and source orientation shown in FIG. 4B.
Figure 4B:
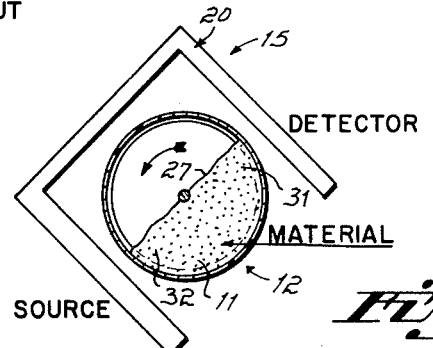
FIG. 4B is a diagrammatic view of a screw conveyor, source and detector in which the source and detector are disposed on opposite sides of the conveyor parallel to one another and substantially normal to the free surface of material within the conveyor.

Subsequently, I empirically determined that optimum linearity and minimum divergence from the desired linear curve 28 could be obtained by orienting the source and detector at an angle substantially perpendicular to the free surface 27 of the material in the manner shown in FIGS. 4B and 1. When the detector and source are oriented in this manner, the actual output curve 34 of the amplified detector output versus loading of the conveyor departs only minimally from the theoretical linear line 28 for conveyor loading of from zero to over 60%. This greatly simplifies the problem of linearizing the output signal from the amplifier particularly for loadings of the conveyor less than 50% as would be normally employed when the conveyor is not used as a feeder, but merely as a screw conveyor.

Moreover, for high loadings of the conveyor, such as for example above 65% such as would be employed when the conveyor is utilized as a feeder, the output curve 34 while having some non-linearity nevertheless departs a much smaller amount from desired linear output line 28 than was the case with either of the orientations of FIGS. 2B or 3B. As a result, a 1% error in detector output signal corresponds only to a 2% change in material loading. This represents a 50% improvement in accuracy over the system illustrated in either FIGS. 2A and 2B or 3A and 3B. As a consequence, the relationship shown in FIGS. 1 and 4B provides the advantage of facilitating linearizing of the output signal from the detector and at the same time provides substantially greater accuracy in the measurements obtained from the system. It will, of course, be appreciated that the detector and source are not normally exactly perpendicular to the free surface of the material, since the angle of this surface varies somewhat with loading. However, as a practical matter, the advantageous results of this invention are obtained by mounting the detector and source perpendicular to the average angle of repose of the material.

From the foregoing disclosure of the general principles of the present invention and the above description of a preferred embodiment, those skilled in the art will readily comprehend various modifications to which the invention is suceptible. For example, if the conveyor speed remains extremely constant, the tachometer can be omitted and the output signal from linearizing circuit 23 can be utilized directly with time to produce a total weight signal. Accordingly, I desire to be limited only by the scope of the following claims.

Having described my invention, I claim:

1. Apparatus for measuring weight of material carried by a screw conveyor, said screw conveyor being disposed in a generally horizontal plane, the material within said conveyor having a free surface disposed at an angle intermediate the horizontal and vertical planes, said apparatus comprising an elongated source of radiation, an elongated detector, means supporting said elongated detector and said source of radiation in a plane transverse to the longitudinal extent of said screw conveyor, said detector and said source of radiation extending parallel to one another and in a plane substantially perpendicular to the free surface of said material, said detector being effective to cause a continuous current flow correlated with the weight of material on a unit length of said conveyor, means responsive to said continuous current for producing an amplified detector output, means for linearizing said amplified detector output, and integating means responsive to the output of said linearizing means for producing a signal correlated with the total weight of material on said conveyor.

2. The apparatus of claim 1 in which said detector and source of radiation are at least substantially as long as the width of said screw conveyor.

3. Apparatus for measuring weight of material carried by a screw conveyor, said screw conveyor being disposed in a generally horizontal plane, the material within said conveyor having a free surface disposed at an angle intermediate the horizontal and vertical planes, said apparatus comprising an elongated source of radiation, an elongated detector, means supporting said elongated detector and said source of radiation in a plane transverse to the longitudinal extent of said screw conveyor, said detector and said source of radiation extending parallel to one another and in a plane substantially perpendicular to the free surface of said material, said detector being effective to cause a continuous current flow correlated with the weight of material on a unit length of said conveyor, means responsive to said continuous current for producing an amplified detector output, means for linearizing said amplified detector output to produce a first electrical signal, means for generating a second electrical signal correlated with the speed of said screw conveyor, means for multiplying said second electrical signal with the first electrical signal to produce a third signal, and means for electrically integrating said third signal to produce a signal correlated with the total weight of material on said conveyor.

4. A method of weighing material carried by a screw conveyor disposed in a substantially horizontal plane, the material within said screw conveyor having a free surface disposed at an angle intermediate the horizontal and vertical planes, said method comprising the steps of disposing a distributed source of radioactive material and an elongated detector of radiant energy in a plane extending transversely of said conveyor, orienting said distributed source of radioactive material and said detector parallel to one another and generally perpendicular to the free surface of said material within said conveyor, attenuating radiation impinging upon the detector with the material being measured, said radiation passing through a complete transverse section of said material within said screw conveyor, utilizing said detector to produce a continuous current flow correlated with the weight of material per unit length of said conveyor, amplifying said current flow, linearizing said amplified current and integrating said amplified current with time to produce an output signal correlated with the total weight of said material.

5. The method of claim 4 in which the distributed source of radioactive material and elongated detector are at least substantially as long as the width of said conveyor.

6. A method of weighing material carried by a screw conveyor disposed in a substantially horizontal plane, the material within said conveyor having a free surface disposed at an angle intermediate the horizontal and vertical planes, said method comprising the steps of disposing a distributed source of radioactive material and an elongated detector of radiant energy in a plane extending transversely of said conveyor, orienting said distributed source of radioactive material and said detector parallel to one another and generally perpendicular to the free surface of said material within said conveyor, attenuating radiation impinging upon the detector with the material being measured, said radiation passing through a complete transverse section of said material within said screw conveyor, utilizing said detector to produce a continuous current flow correlated with the weight of material per unit length of said conveyor, amplifying said current flow, linearizing said amplified current to produce a first electrical signal, generating a seocnd electrical signal correlated with the speed of said screw conveyor, multiplying said signals to obtain a third signal, and integrating said third signal with time to produce an output signal correlated with the total weight of said material.

References Cited

UNITED STATES PATENTS

| | | |
|---|---|---|
| 2,953,682 | 9/1960 | Frank et al. |
| 3,036,214 | 5/1962 | Forney et al. |
| 3,278,747 | 10/1966 | Ohmart. |

RALPH G. NILSON, Primary Examiner

S. ELBAUM, Assistant Examiner

U.S. Cl. X.R.

250—83.3